United States Patent
Tong et al.

(10) Patent No.: US 7,593,381 B2
(45) Date of Patent: Sep. 22, 2009

(54) MOBILE COMMUNICATION TERMINAL, AND ANTENNA ARRAY DIRECTIVITY-PATTERN-CONTROLLING METHOD

(75) Inventors: Fangwei Tong, Tokyo (JP); Masanori Kato, Yokohama (JP)

(73) Assignee: Kyocera Corporation, Fushimi-ku, Kyoto-shi, Kyoto (JP)

( * ) Notice: Subject to any disclaimer, the term of this patent is extended or adjusted under 35 U.S.C. 154(b) by 955 days.

(21) Appl. No.: 10/277,331

(22) Filed: Oct. 22, 2002

(65) Prior Publication Data

US 2004/0013094 A1    Jan. 22, 2004

(30) Foreign Application Priority Data

Oct. 25, 2001 (JP) ............................ P2001-328280

(51) Int. Cl.
H04B 7/216    (2006.01)
(52) U.S. Cl. .................. 370/342; 370/441; 455/562.1
(58) Field of Classification Search .................. None
See application file for complete search history.

(56) References Cited

U.S. PATENT DOCUMENTS

| | | | | |
|---|---|---|---|---|
| 6,087,986 A | * | 7/2000 | Shoki et al. | 342/383 |
| 6,128,276 A | * | 10/2000 | Agee | 370/208 |
| 6,347,220 B1 | * | 2/2002 | Tanaka et al. | 455/277.2 |
| 6,347,234 B1 | * | 2/2002 | Scherzer | 455/562.1 |
| 6,492,942 B1 | * | 12/2002 | Kezys | 342/368 |
| 6,661,833 B1 | * | 12/2003 | Black et al. | 375/147 |
| 6,792,290 B2 | * | 9/2004 | Proctor et al. | 455/562.1 |
| 6,985,466 B1 | * | 1/2006 | Yun et al. | 370/335 |
| 7,006,042 B2 | * | 2/2006 | Tong et al. | 342/377 |

FOREIGN PATENT DOCUMENTS

| JP | 2000224097 | 8/2000 |
|---|---|---|
| WO | WO 01/13530 A1 | 2/2001 |

OTHER PUBLICATIONS

Japanese Office Action dated Aug. 11, 2005 (w/ English translation).
Chinese Office Action dated Aug. 6, 2004 (w/ English translation).
ANSI/TIA/EIA-95-B—CDMA Standard, Sections 7.1.3.1.11.2 to 7.1.3.3.1, pp. 7-27 to 7-29.

* cited by examiner

Primary Examiner—Michael J Moore, Jr.
(74) Attorney, Agent, or Firm—Schulte Roth & Zabel LLP; John C. Garces

(57) ABSTRACT

In a mobile communication terminal for performing wireless communication by receiving wireless signals according to CDMA communication system containing pilot signals by an antenna array containing a plurality of antenna elements (1-1 to 1-N), despreading processing is performed on received signals $x_1$ to $X_N$ at each of the antenna array elements (1-1 to 1-N) according to a predetermined despreading code. An array response vector composed of pilot signals which are extracted by an array response vector detecting section for each of the antenna elements (1-1 to 1-N) represents the arriving direction of wireless signals. In order to form a directivity pattern of the antenna array containing antenna elements (1-1 to 1-N), a weighting operation is performed according to the array response vector. By doing this, it is possible to control the antenna array directivity pattern stably for performing wireless communication by receiving wireless signals according to a CDMA communication system.

6 Claims, 3 Drawing Sheets

INCOMING DIRECTION OF SIGNAL

INCOMING DIRECTION OF SIGNAL

MOBILE COMMUNICATION TERMINAL, AND ANTENNA ARRAY DIRECTIVITY-PATTERN-CONTROLLING METHOD

BACKGROUND OF THE INVENTION

1. Field of the Invention

The present invention relates to a mobile communication terminal for performing wireless communication by receiving a wireless signal according to a Code-Division-Multiple-Access (hereinafter called CDMA) communication system by using an antenna array containing a plurality of antenna elements. Also, the present invention relates to a directivity-pattern-controlling method for the antenna array.

2. Description of Related Art

In a mobile communication system, a base station is conventionally provided with an antenna array containing a plurality of antenna elements. The base station forms a directivity pattern for transmitting and receiving the signal and follows the position of the mobile communication terminal. Also, in a mobile communication system, following performance (maintainability of wireless communication connection with a base station) of the mobile communication terminal such as a mobile phone for a base station becomes more important from a communication quality point of view. Therefore, it is proposed that an antenna array containing a plurality of antenna elements is provided to the mobile communication terminal so as to form a directivity pattern for transmitting and receiving signals For conventional controlling methods for an antenna array directivity pattern, for example, an adaptive algorithm based on a Minimum Mean-Squared Error (hereinafter called MMSE) such as Recursive Least Square Algorithm (hereinafter called RLS algorithm), Sample Matrix Inversion algorithm (hereinafter called SMI algorithm), and Least Mean Square algorithm (hereinafter called LMS algorithm) is used therfor. In this controlling method, a set of weighting factors for forming a directivity pattern of an antenna array containing a plurality of antenna elements is determined according to an adaptive algorithm such that a squared error between a signal which is received from the base station and a reference signal which is locally generated is minimized.

However, there is a problem as follows when a conventional directivity-pattern-controlling method for an antenna array is applied to a mobile communication terminal for performing a wireless communication by receiving a wireless signal according to CDMA communication system. Conventional directivity-pattern-controlling methods for an antenna array need a reference signal for its own use. In a conventional directivity-pattern-controlling method, a set of weighting factors is determined such that a square error between the received signal and the reference signal is minimum. When a despreading process is performed on the received signal, the desired signal is amplified by an amount of spread gain; thus, there is less effect caused by noise and interference signal for forming a directivity pattern. Also, there is less interference in a mobile station environment than in a base station environment, and interference level is usually less than that of the desired signal. Therefore, there is a possibility that convergence performance of an adaptive algorithm for determining a set of weighting factors for forming a directivity pattern of an antenna array will degrade. Furthermore, there is a possibility that a weighting factor cannot be determined due to the divergence of a recursive calculation used for determining the weighting factors. Accordingly, directivity-pattern-controlling operation of an antenna array becomes unstable.

FIG. 4 is a view showing a series of directivity patterns of an antenna array which are formed by controlling a directivity pattern of an antenna array by applying a conventional antenna array directivity-pattern-controlling method (LMS algorithm is used thereat) after despreading when a wireless signal according to CDMA communication system is received at a mobile station (downlink). In FIG. 4, iteratively updated directivity pattern of a four-element-$\lambda/2$-spacing linear antenna array are shown. As shown in FIG. 4, a stable directivity pattern whose main beam is oriented to the incidence direction of a signal has not been formed by a conventional controlling method using an LMS algorithm. This is because the convergence performance of the LMS algorithm degrades for the above-mentioned reason.

As explained above, when a directivity pattern of an antenna array is controlled by applying a conventional antenna array directivity-pattern-controlling method after despreading to a CDMA mobile communication terminal, directivity-pattern-controlling operation becomes unstable. Thus, it is difficult to improve the tracking performance of the directivity pattern to a base station.

Also, when a high-speed antenna array directivity-pattern-controlling method such as RLS or SMI is used, a calculation amount for determining a weighting factor is large for minimizing the square error; therefore, electricity consumption increases. As a result, there is a problem in that battery life of the mobile communication terminal is short.

SUMMARY OF THE INVENTION

The present invention is made in consideration of the above conditions. An object of the present invention is to provide a mobile communication terminal which can control the directivity pattern of an antenna array when a wireless communication is performed by receiving a wireless signal according to CDMA communication system by using an antenna array containing a plurality of antenna elements, and controlling method thereof.

Also, another object of the present invention is to provide a mobile communication terminal which can reduce the operating amount of the process for determining a set of weighting factors for forming a directivity pattern of an antenna array, and a controlling method thereof.

In order to solve the above-mentioned problems, a first aspect of the present invention is characterized in that a mobile communication terminal for performing wireless communication by receiving a wireless signal containing a pilot signal in accordance with Code Division Multiple Access protocol comprises:

an antenna array having a plurality of antenna elements;

a pilot signal despreading device for performing a despreading process on a signal received by the antenna element by a predetermined despreading code and extracting the pilot signal for each antenna element; and a directivity-pattern-controlling device for performing weighting operation to form a directivity pattern of the antenna array having a plurality of the antenna elements according to the pilot signal which is extracted by the pilot signal despreading device per the antenna element.

A second aspect of the present invention is characterized in that a directivity-pattern-controlling device in a mobile communication terminal comprises:

a phase calculating device for determining a phase angle of the pilot signal;

a weighting factor calculating device for determining a set of weighting factors for forming directivity pattern of the antenna array by using the phase angle determined by the phase calculating device.

A third aspect of the present invention is characterized in that a directivity-pattern-controlling device in a mobile communication terminal comprises a weighting factor calculating device for forming directivity pattern of the antenna array wherein the pilot signal is used as a weighting factor, or the weighting factor is determined by multiplying the pilot signal by a constant number.

A fourth aspect of the present invention is characterized in that the directivity-pattern-controlling device controls a receiving directivity pattern of the antenna array by multiplying the received signal by the weighting factor.

A fifth aspect of the present invention is characterized in that the directivity-pattern-controlling device compensates the weighting factor according to a transmitting frequency and controls a transmitting directivity pattern of the antenna array by multiplying the transmitting signal by the compensated weighting factor.

A sixth aspect of the present invention is characterized in that the controlling method for antenna array directivity pattern in a mobile communication terminal having an antenna array containing a plurality of antenna elements for performing wireless communication by receiving a wireless signal containing a pilot signal in accordance with Code Division Multiple Access protocol by the antenna array, comprises steps of:

performing despreading process on a received signal at the antenna element by a predetermined despreading code and extracting the pilot signal for each antenna element;

performing directivity-pattern-controlling process so as to form a directivity pattern of the antenna array containing a plurality of the antenna elements according to the pilot signal for each antenna element.

A seventh aspect of the present invention is characterized in that, in a controlling method for antenna array directivity pattern, the directivity-pattern-controlling process comprises steps of:

calculating the phase angle of the pilot signal for each antenna element; and determining a set of weighting factors for forming directivity pattern of the antenna array by using the phase angle of the pilot signal of each antenna element.

An eighth aspect of the present invention is characterized in that controlling method for antenna array directivity pattern contains the directivity-pattern-controlling process in which:

the pilot signal is used as a weighting factor; or the weighting factor is determined by multiplying the pilot signal by a constant.

As explained above, according to the present invention, received signals of each of the antenna elements are despread by a predetermined despreading code so as to extract a predetermined pilot signal for antenna array elements. The pilot signal contains phase information which relates to the arriving direction of the signal. The extracted pilot signal can be regarded as an array response vector which indicates the incoming direction of a wireless signal. In the present invention, it is possible to work out the array weighting factors from the phase information of the pilot signal for each antenna element in order to form a directivity pattern of an antenna array containing a plurality of antenna elements directly. Therefore, it is not necessary to use an adaptive algorithm which needs a reference signal. Also, there is not a problem caused by convergence performance of the adaptive algorithm such as divergence of recursive calculations. Therefore, there is an effect in that the directivity pattern of an antenna array can be controlled stably.

By doing this, it is possible to control the directivity pattern of an antenna array so as to direct the main beam of the directivity pattern toward the incoming direction of the wireless signal stably even when a mobile communication terminal changes its position. As a result, there is an advantage for providing a mobile communication terminal which can realize more superior communication quality to that of the conventional device.

According to the second or seventh aspect of the present invention, first a phase angle of a pilot signal is determined and then the weighting factor for forming the directivity pattern of an antenna array by using the phase angle is determined. Therefore, it is possible to determine the weighting factor without performing recursive calculations. Therefore, it is possible to reduce processing for determining the weighting factor for forming the directivity pattern of an antenna array. Thus, it is possible to reduce electricity consumption.

According to the third or eighth aspect of the present invention, the extracted pilot signal, or the pilot signal multiplied by a constant number, is used as the array weighting factor for forming the directivity pattern of an antenna array. Therefore, it is possible to determine the array weighting factor without performing recursive calculations. As a result, it is possible to reduce processing for determining a weighting factor for forming the directivity pattern of an antenna array. Thus, it is possible to reduce electricity consumption.

As explained above, it is possible to reduce electricity consumption, in the present invention, and it is possible to reduce electricity consumption of batteries in a mobile communication terminal. As a result, there is an effect in that battery-charging frequency may decrease such that a mobile phone which lasts longer and is easy to handle can be realized.

DETAILED DESCRIPTION OF THE INVENTION

Figure 1:
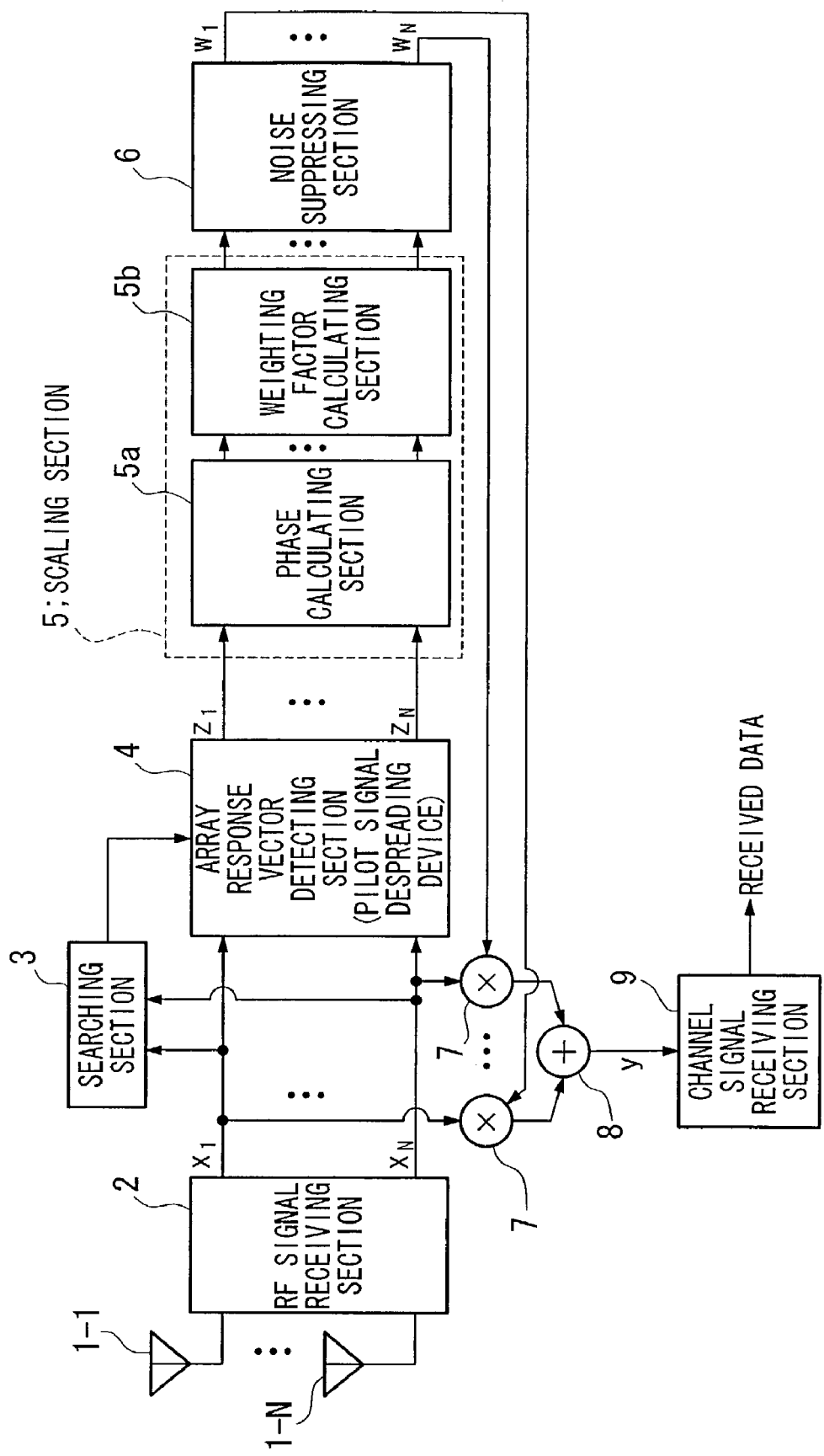
FIG. 1 is a block diagram of a receiving function of a mobile communication terminal according to an embodiment of the present invention.

Embodiments of the present invention are explained with reference to the drawings as follows. A mobile phone is explained in the embodiment as an example of a mobile communication terminal. FIG. 1 is a block diagram showing a signal receiving function in a mobile communication terminal (mobile phone unit) according to an embodiment of the present invention. A mobile phone shown in FIG. 1 receives a wireless signal according to CDMA communication system by using an antenna array containing a plurality of antenna elements so as to perform wireless communication. FIG. 1 shows a block only for a signal receiving function. However, other function blocks are the same as that of a conventional mobile phone; thus, the explanation thereof is omitted.

First, a general description of the present embodiment of an antenna array directivity-pattern-controlling method is made as follows. A mobile-phone receives a wireless signal according to CDMA communication system from a base station. The wireless signal contains a predeterined pilot signal (for example, CDMA U.S. standard "TIA.EIA-95B, §7.1.3.2"), which is used to identify base stations and detect spreading code (PN code), chip synchronization timing (finger) and the strength of signals transmitted from a plurality of base stations, and thereby a signal with the strongest strength can be selected by a CDMA mobile phone (which can be realized by a searcher). The pilot signal, which can be regarded as "1+j" in mathematics and is spread by the spreading code on its real and imaginary part respectively, is transmitted from the base station.

On the other hand, in a mobile phone, a despreading code which can extract a pilot signal is set in advance. In the present embodiment of an antenna array directivity-pattern-controlling method, a despreading process is performed on a signal which is received at each antenna element contained in an antenna array by a despreading code (PN code), a pilot signal which is contained in a signal which is received at each antenna element is extracted.

The pilot signal which is extracted for each of the antenna elements contains phase information which indicates incoming direction of the wireless signal. The phase information can be regarded as an array response vector which indicates an incoming direction of the wireless signal. In the present invention, the array weighting factors are worked out and thereby a directivity pattern of an antenna array containing a plurality of antenna elements is formed directly from the phase information of the extracted pilot signal at each array element, which compose the array response vector of the received wireless signal. Therefore, it is not necessary to use an adaptive algorithm which requires a reference signal whose generation is usually complicated. Also, there is no problem caused by the convergence performance of a recursive adaptive algorithm, such as the divergence of recursive calculation; therefore, it is possible to control the directivity pattern of an antenna array stably in the present invention.

A mobile phone using an antenna array directivity-pattern-controlling method according to the present invention is explained with reference to FIG. 1 as follows. In FIG. 1, reference numerals 1-1 and 1-N (N is an integer which is 2 or larger) indicate N pieces of antenna elements contained in an antenna array. A reference numeral 2 indicates a radio frequency (RF) receiving section for receiving N pieces of CDMA wireless signal via antenna elements 1-1 to 1-N simultaneously and outputting receiving signals $x_1$ to $x_N$ corresponding to the antenna elements 1-1 to 1-N. The RF receiving section 2 contains a wireless signal receiving circuit, a down converter, and an analogue-digital converter, and generates receiving signals $x_1$ to $x_N$ by digitizing the N pieces of received wireless signal.

A reference numeral 3 indicates a searching section (searcher) for performing PN code chip synchronization timing (finger), and the strongest signal selection detection by using an arbitary one of the receiving signals $x_1$ to $x_N$ and outputting chip synchroniztion timing (finger) of a selected desired signal.

Reference numeral 4 indicates an array response vector detecting section for performing despreading processing on the receiving signals $x_1$ to $x_N$ by the despreading code (PN code) and extracting the pilot signals $Z_1$ to $Z_N$ contained in the receiving signals $x_1$ to $x_N$ for each of the antenna elements so as to output. The array response vector detecting section 4 performs despreading processing on the receiving signals $x_1$ to $x_N$ according to the chip synchronization timing (finger) which is detected by the searching section 3. The pilot signals $Z_1$ to $Z_N$ which are extracted in this way compose array response vectors [$Z_1$ to $Z_N$] representing incoming direction of the signal.

A reference numeral 5 indicates a scaling section containing a phase calculating section which is indicated by a reference numeral 5a and a weighting factor calculating section which is indicated by a reference numeral 5b. A scaling section 5 adjusts the amplitude of the pilot signal which is extracted by the array response vector detecting section 4. The phase calculating section 5a calculates phase angles $\theta_1$ to $\theta_N$ of the pilot signals $Z_1$ to $Z_N$ so as to output. Furthermore, the weighting factor calculating section 5b calculates weighting factors $W_1$ to $W_N$ for the antenna elements 1 to 1-N by using the phase angles $\theta_1$ to $\theta_N$.

Reference numeral 6 indicates a noise suppressing section such as a low-pass filter for suppressing a noise component contained in the weighting factors $W_1$ to $W_N$. For the noise suppressing section 6, a moving average low-pass filter can be used. When an influence caused by noise is small, a noise suppressing section 6 is not necessary.

Reference numeral 7 indicates a multiplier. The multipliers are provided in N pieces. Reference numeral 8 indicates an adder. N pieces of multipliers 7 multiply by receiving signals $x_1$ to $x_N$ by the conjugate of weighting factors $W_1$ to $W_N$, which is outputted from the noise suppressing section 6, respectively. The total sum of the result of the above-mentioned multiplication is calculated by the adder 8. An output signal y by the adder 8 becomes an output signal of the antenna array which has a receiving directivity pattern formed by the weighting factors $W_1$ to $W_N$. A reference numeral 9 indicates a channel signal receiving section which detects channel signals (SYNC, Paging, Traffic, etc.) from the antenna array output signal y.

Next, an array response vector detection operation by an array response vector detecting section 4 by extracting the pilot signals $Z_1$ to $Z_N$ from the receiving signals $x_1$ to $x_N$ is explained. First, a receiving signal $x_i$ which corresponds to an antenna element 1-i (i is an integer from 1 to N) is indicated by a formula F1.

$$x_i = A_i[P_I(t) + jP_Q(t) + s(t)P_I(t) + js(t)P_Q(t)]e^{j\theta_i} \qquad F1$$
$$= A_i e^{jPN(t)} e^{j\theta_i} + A_i s(t)[P_I(t) + jP_Q(t)]e^{j\theta_i}$$

Here, $A_i$ indicates an amplitude of the receiving signal of antenna element 1-i. $P_I(t)$ and $P_Q(t)$ indicate a real part and an imaginary part of spreading code (PN code)("I" and "Q" indicate a real part and an imaginary part respectively).

$e^{jPN(t)} = P_I(t) + jP_Q(t)$ and $e^{j\theta_i}$ is a phase components resulting from incoming directions of wireless signal.

$A_i e^{jPN(t)} e^{j\theta_i}$ indicates a pilot channel signal. s(t) indicates channel signals other than the pilot channel such as SYNC, Paging, or Traffic, etc.

According to the CDMA communication system, channel signals other than the pilot channel indicated by s(t) in a formula F1 are orthogonal to the pilot channel signal. Therefore, the channel signals other than the pilot channel become 0 (zero) after a despreading process for extracting the pilot signal. For the sake of explanation here, it is assumed that $x_i$ contains only a pilot channel signal. According to the assumption, $x_i$ is indicated by the following formula F2.

$$x_i = A_i e^{jPN(t)} e^{j\theta_i} \qquad \text{F2}$$

The array response vector detecting section 4 performs despreading to the $x_i$ indicated in the formula F1 by the predetermined despreading code (PN code) according to the chip synchronization timing (finger) output from the searching section 3 so as to extract a pilot signal $Z_i$. The pilot signal $Z_i$ can be indicated by the following formula F3.

$$Z_i = \int_T x_i e^{-jPN(t)} e^{j\alpha} dt \qquad \text{F3}$$

Here, T indicates a range of despreading calculation. An $e^{-jPN(t)}$ indicates a predetermined despreading code. An $e^{j\alpha}$ indicates a fixed unknown phase component caused by such as a fixed phase error of an array element which is used in chip synchronization timing (finger) detection. When $x_i$ of the formula F2 is incorporated into the formula F3, $Z_i$ is indicated by the following formula F4.

$$Z_i = \int_T A_i e^{jPN(t)} e^{j\theta_i} e^{-jPN(t)} e^{j\alpha} dt \qquad \text{F4}$$
$$= A_i T e^{j\theta_i} e^{j\alpha}$$

The array response vector detecting section 4 performs the above-mentioned process on the antenna elements 1-1 to 1-N so as to determine $Z_1$ to $Z_N$. These $Z_1$ to $Z_N$ compose vectors $[Z_1 \text{ to } Z_N]=[A_1 e^{j\theta_1} \text{ to } A_N e^{j\theta_N}]T e^{j\alpha}$ which is the array response vectors. Each of $Z_i$ (i is an integer from 1 to N) indicates an element of the array response vector. $e^{j\alpha}$ in the formula F3 does not influence the array response vector; thus, it is assumed that $\alpha=0$ and $e^{j\alpha}=1$.

As shown in the present embodiment, when a received signal $x_i$ is a digitized descrete signal, the received signal $x_i$ is indicated by the following formula F5.

$$x_i = A_i e^{jPN(nTs)} e^{j\theta_i} \qquad \text{F5}$$

Here, Ts indicates a sampling period. n indicates a sampling number. Also, the extracted pilot signal $Z_i$ which is the element of the array response vector can be indicated by the following formula F6.

$$Z_i = \sum_{n=0}^{M-1} x_i e^{-jPN(nTs)} e^{j\alpha} \qquad \text{F6}$$
$$= \sum_{n=0}^{M-1} A_i e^{jPN(nTs)} e^{j\theta_1} e^{-jPN(nTs)} e^{j\alpha}$$
$$= A_i M e^{j\theta_i} e^{j\alpha}$$

Here, M indicates a range of despreading calculation.

Next, a scaling process in which a scaling section 5 adjusts an amplitude of $Z_1$ to $Z_N$ is explained. Amplitudes of elements $Z_1, Z_2,$ to $Z_N$ of an array response vector $[Z_1, Z_2,$ to $Z_N]$ which are output from the array response vector detecting section 4 are proportional to amplitudes of the received signal $x_1, x_2,$ to $x_N$. When a fluctuation range of an amplitude of the received signal is large, it is desirable to limit the amplitude of the element of the array response vector in a certain range. The scaling section 5 is disposed for such a purpose.

First, a phase calculating section 5a calculates a phase angle $\theta_1$ of the pilot signal $Z_i$, which is indicated in the formula F4, by the following formula F7. Here, it is assumed that $\alpha=0$.

$$\theta_i = \tan^{-1}\left(\frac{\text{Im}(Z_i)}{\text{Re}(Z_i)}\right) \qquad \text{F7}$$

Here, $\text{Re}(Z_i)$ indicates a real part of $Z_1$. $\text{Im}(Z_1)$ indicates an imaginary part of $Z_1$.

Consequently, the weighting factor calculating section 5b calculates the weighting factor $W_i$ for the antenna element 1-i by using the phase angle $\theta_i$ which is calculated by the formula F7 according to a formula F8 as follows. By doing this, the amplitude of the weighting factor $W_i$ is constant with regard to the amplitude of the received signal.

$$w_i = e^{j\theta_i} \qquad \text{F8}$$

Here, the scaling section 5 only adjusts amplitude of array response vector element; therefore, it is acceptable to perform scaling according to formulae F9 or F10 as follows.

$$W_i = Z_i Z_0 \qquad \text{F9}$$

$$W_i = Z_i C_i \qquad \text{F10}$$

Here, $Z_0$ is an arbitrary constant number (complex number or real number) other than 0 (zero). Also, $C_i$ (i=1 to N) is a real number other than 0 (zero).

For example, when the received signal strength at the antenna element does not change greatly, it is acceptable that Zi which is extracted by the array response vector detecting section 4 is directly used as $W_i$ under conditions such as $Z_0=1$. Also, it is acceptable that $Z_0$ be set to be another fixed value. Also, it is acceptable that $Z_0$ be calculated according to the formula F11 as follows.

$$Z_0 = \frac{1}{\frac{1}{N}\sum_{i=1}^{N}|x_i|^2} \qquad \text{F11}$$

Otherwise, $Z_0$ can by calculated according to a formula F12 by using a receiving signal strength indicator (RSSI value) which is detected by a mobile communication terminal.

$$Z_0 = \frac{1}{RSSI} \qquad \text{F12}$$

Otherwise, $C_i$ can be calculated according to formulas F13 and F14 as follows.

$$C_i = k|x_i|^2, \; i=1, 2, \ldots, N \qquad \text{F13}$$

$$k = \frac{1}{\sum_{i=1}^{N}|x_i|^2} \qquad \text{F14}$$

There are other calculation methods for determining $Z_0$ or $C_i$. It is required only that $Z_0$ or $C_i$ be determined such that the amplitude of the array response vector element is within a certain range.

When a weighting factor $W_i$ is determined by formula F9 or F10, pilot signals $Z_1$ to $Z_N$ which are output from the array response vector detecting section 4 are input to the weighting factor calculating section 5b. Therefore, a phase detecting section 5a is not necessary to be provided thereat.

A noise component in the weighting factor $W_1$ to $W_N$ calculated in the above-mentioned way is suppressed by the noise suppressing section 6. The received signal $x_i$ to $x_N$ is multiplied in N pieces of multipliers 7 by the conjugate of the weighting factor $W_1$ to $W_N$ after suppressing the noise by the noise suppressing section 6. The output signals of N pieces of the multipliers 7 are the weighted signals of each of the received signals $x_1$ to $x_N$ according to the array response vector $[Z_1$ to $Z_N]$ composed of the pilot signals $Z_1$ to $Z_N$.

Next, a sum of the above multiplication by the N pieces of multipliers 7 is calculated by an adder 8. An output signal y from the adder 8 becomes the output signal of the antenna array which has a receiving directivity pattern formed by the weighting factor $W_1$ to $W_N$. By doing this, it is possible to control the receiving directivity pattern of an antenna array stably.

Figure 2:
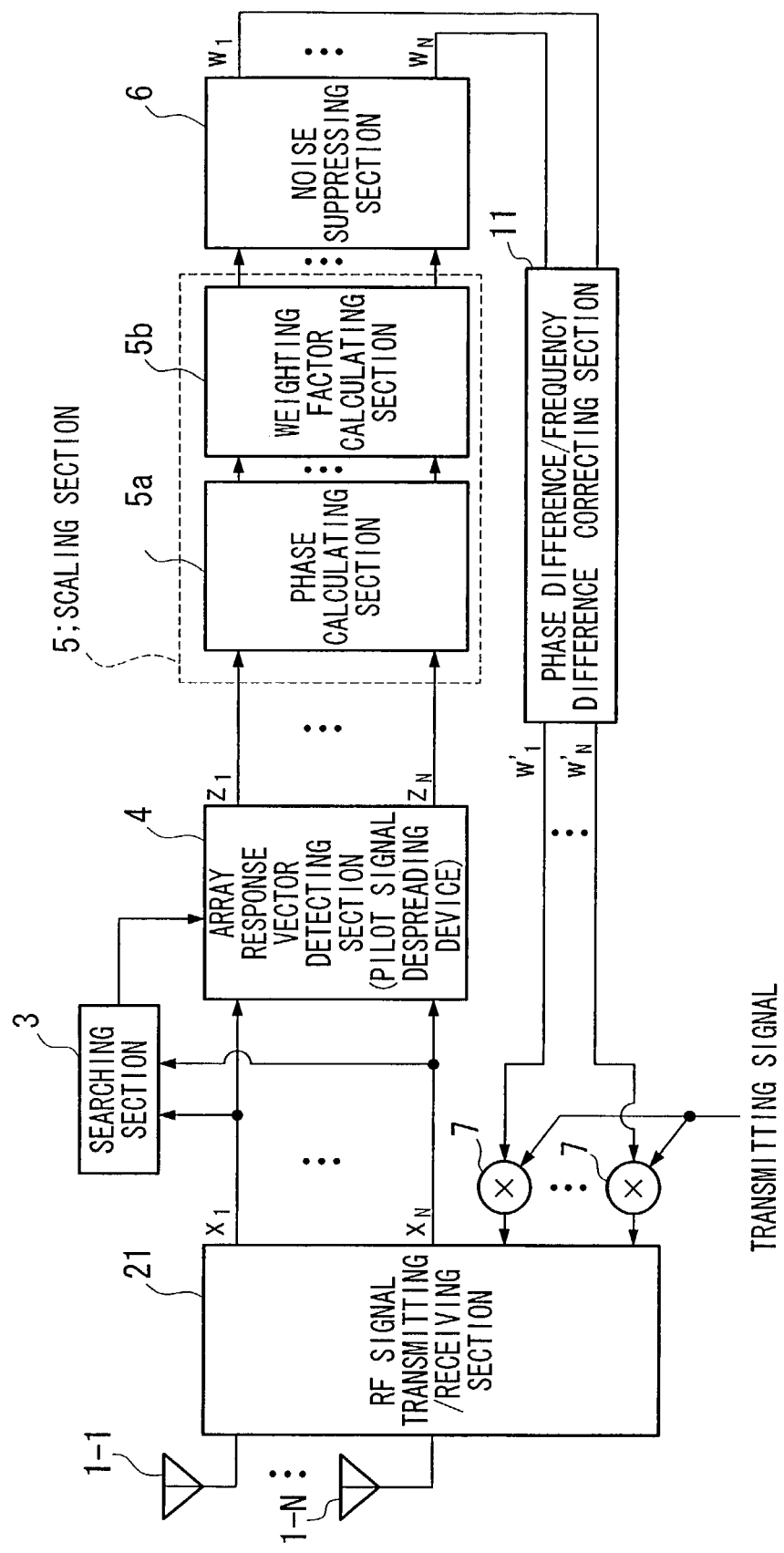
FIG. 2 is a block diagram of a transmitting function section of a mobile phone unit as shown in FIG. 1 according to the present embodiment.

FIG. 2 is a block diagram showing the above-mentioned embodiment of the transmitting function section of the mobile phone. In FIG. 2, hereinafter, the same reference numerals are applied to corresponding elements as shown in FIG. 1 so as to omit the repeated explanation thereof. As shown in FIG. 2, the noise component contained in weighting factor $W_1$ to $W_N$, which are calculated in the weighting factor calculating section 5b, is suppressed by the noise suppressing section 6. Furthermore, a phase difference/frequency difference correcting section 11 compensates the noise suppressed weighting factor $W_1$ to $W_N$ for the fixed original phase difference between antenna elements and for the difference between transmission and receiving frequency if necessary.

Next, the conjugate of the weighting factors $W'_1$ to $W'_N$ which are output from the phase difference/frequency difference correcting section 11 are multiplied to the transmitting signals by N pieces of the multipliers 7. The output signals from these multipliers 7 are transmitted from the antenna elements 1-1 to 1-N by the RF transmitting and receiving section 21. The output signal from the multipliers 7 is the transmitting signal of an antenna array which has the transmitting directivity pattern formed by weighting factor $W_1$ to $W_N$. By doing this, it is possible to control the transmitting directivity pattern of an antenna array stably.

Here, it is acceptable that the transmission/receiving directivity pattern of an antenna array be formed by combining the above-mentioned embodiments as shown in FIGS. 1 and 2.

Figure 3:
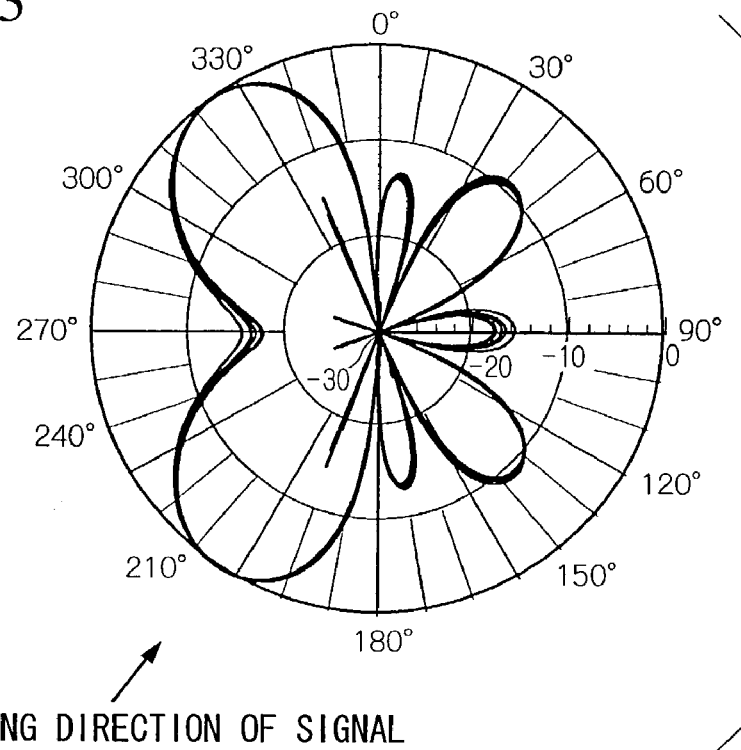
FIG. 3 is a view showing an antenna directivity pattern which is formed by controlling the antenna directivity pattern according to an antenna array directivity-pattern-controlling method according to the present embodiment.
Figure 4:
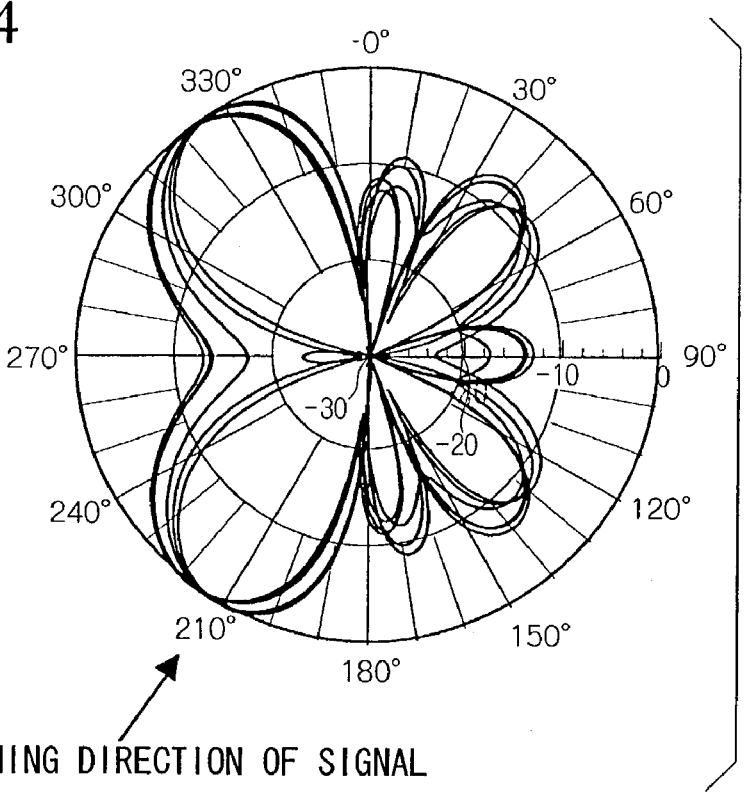
FIG. 4 is a view showing an antenna directivity pattern which is formed by controlling an antenna directivity pattern according to a conventional antenna array directivity-pattern-controlling method.

FIG. 3 is a view showing an antenna directivity pattern which is formed by controlling directivity pattern of an antenna array in the present embodiment of the present invention. In FIG. 3, iteratively updated directivity patterns of a four-element-λ/2-spacing linear antenna array are shown. As shown in FIG. 3, it is understood that the main beam of directivity patterns are oriented to an incoming direction of the signal and that an antenna array directivity pattern is controlled stably.

As explained above, according to the present embodiment, it is not necessary to use an adaptive algorithm which requires a reference signal. Also, there is not a problem of convergence in performance of the adaptive algorithm such as a divergence of recursive calculation. Thus, it is possible to control the directivity pattern of an antenna array stably. By doing this, even if a mobile communication terminal changes its position, it is possible to control the directivity pattern of an antenna array stably so as to be directed toward the incoming direction of a wireless signal.

In the present invention, the phase angle of the pilot signal is calculated for each antenna element and the weighting factor of the corresponding antenna element is calculated by using the phase angle. Therefore, it is possible to determine the weighting factor without performing recursive calculation. By doing this, it is possible to reduce processing for determine the weighting factor for forming the directivity pattern of the antenna array. Thus, it is possible to reduce electricity consumption.

The mobile communication terminals of the present invention include a mobile terminal such as personal digital assistants (hereinafter called PDAs) as well as ordinary mobile phones. PDAs are supposed to contain a wireless communication device therein.

Also, the mobile communication terminals include wireless communication apparatuses such as a car phone which is provided to a mobile member such as a car and a train.

As explained above, embodiments of the present invention are explained in detail with reference to the drawings. It is understood that the foregoing description is that of the preferred embodiments of the invention and that various changes and modifications may be made thereto without departing from the spirit and scope of the invention as defined in the appended claims.

What is claimed is:

1. A mobile communication terminal for performing wireless communication by receiving a wireless signal containing a pilot signal in accordance with a Code Division Multiple Access communication system, comprising:
   an antenna array having a plurality of antenna elements;
   a pilot signal despreading device for performing a despreading process on a received signal by the antenna element by a predetermined despreading code and extracting the pilot signal for each antenna element;
   a directivity-pattern-controlling device for performing a weighting operation so as to form a directivity pattern of the antenna array having a plurality of the antenna elements according to the pilot signal which is extracted for each antenna element by the pilot signal despreading device of the antenna elements and performing directivity control based on an obtained weight, wherein
   the directivity-pattern controlling device performs the weighting operation so the pilot signal received by each antenna element is correlated one by one to the corresponding weight,
   the directivity-pattern controlling device comprises a weighting factor calculating device for forming the directivity pattern of the antenna array wherein the pilot signal is used directly as the weighting factor for performing the weighting operation; and
   the weighting factor is determined by multiplying the pilot signal by a constant number.

2. A mobile communication terminal according to claim 1, wherein a directivity-pattern-controlling device comprises:
   a phase calculating device for determining a phase angle of the pilot signal; and
   a weighting factor calculating device for determining a set of weighting factors for forming a directivity pattern of the antenna array by using the phase angle determined by the phase calculating device.

3. A mobile communication terminal according to claim 2 wherein the directivity-pattern-controlling device controls a receiving directivity pattern of the antenna array by multiplying the received signal by a conjugate of a weighting factor.

4. A mobile communication terminal according to claim 2 wherein the directivity-pattern-controlling device corrects the weighting factor according to a transmitting frequency and controls a transmitting directivity pattern of the antenna array by multiplying the transmitting signal by a conjugate of the corrected weighting factor.

5. A method for controlling an antenna array directivity pattern in a mobile communication terminal having an antenna array containing a plurality of antenna elements for performing wireless communication by receiving a wireless signal containing a pilot signal in accordance with a Code Division Multiple Access communication system by the antenna array, comprising the steps of:

performing despreading processing on a received signal at an antenna element by a predetermined despreading code and extracting the pilot signal for each antenna element; and performing a directivity-pattern-controlling process for weighting the signals received by antenna elements so as to form a directivity pattern of the antenna array containing a plurality of the antenna elements according to the extracted pilot signal for each antenna element and correlating the pilot signal received by each antenna element one by one to the corresponding antenna element, wherein the pilot signal is used directly as a weighting factor; and the weighting factor is determined by multiplying the pilot signal by a constant number.

6. A method for controlling an antenna array directivity pattern according to claim 5 wherein the directivity-pattern-controlling process comprises the steps of:

calculating a phase angle of the pilot signal; and calculating a set of weighting factors for forming a directivity pattern of the antenna array by using the phase angle.

* * * * *